Sept. 8, 1964     H. G. INHOFER     3,147,568
WEED SPRAYING DEVICE
Filed Dec. 27, 1962     3 Sheets-Sheet 1
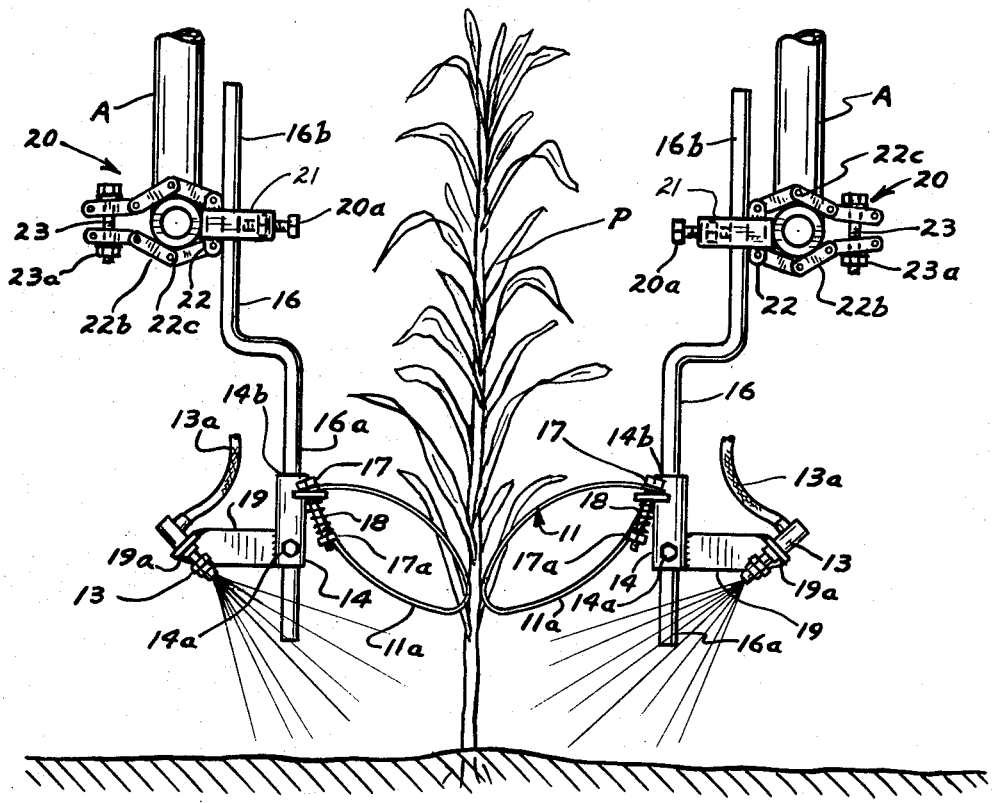
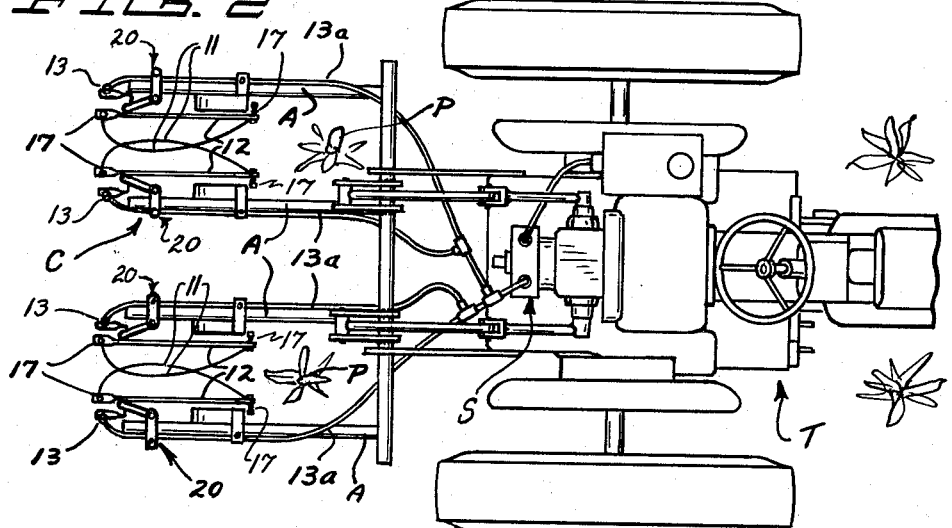
INVENTOR.
HAROLD G. INHOFER
BY John W. Adams
ATTORNEY Sept. 8, 1964        H. G. INHOFER        3,147,568
WEED SPRAYING DEVICE Filed Dec. 27, 1962        3 Sheets-Sheet 2

INVENTOR.
HAROLD G. INHOFER
BY
John W. Adams
ATTORNEY

Sept. 8, 1964 H. G. INHOFER 3,147,568
WEED SPRAYING DEVICE
Filed Dec. 27, 1962 3 Sheets-Sheet 3
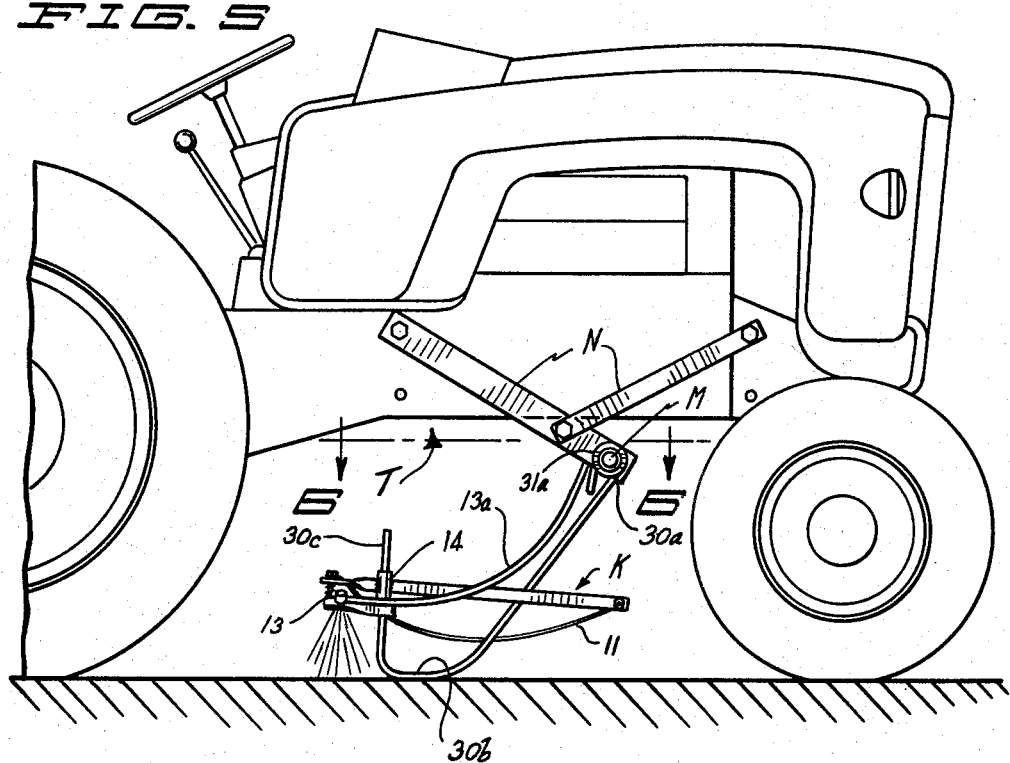
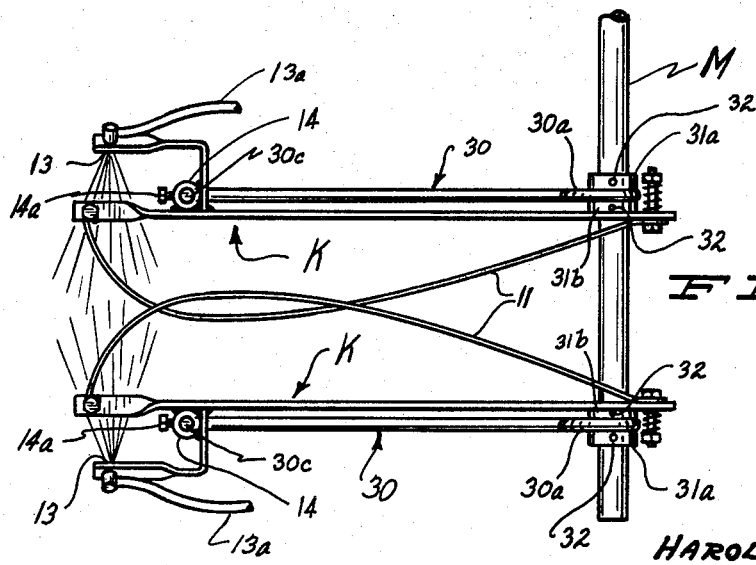
INVENTOR.
HAROLD G. INHOFER
BY
John W. Adams
ATTORNEY

United States Patent Office 3,147,568
Patented Sept. 8, 1964

3,147,568
WEED SPRAYING DEVICE
Harold G. Inhofer, Fairfax, Minn.
Filed Dec. 27, 1962, Ser. No. 247,737
6 Claims. (Cl. 47—1.7)

This invention relates generally to a weed spraying device and more specifically to a weed spraying device designed to raise the lower leaves of a plant and allow the weed killing solution to be sprayed on weeds growing close to the plant without spraying any of the solution on the leaves of the plant.

Within the past few years, chemical solutions have been developed which will effectively kill obnoxious weeds and grasses detrimental to the healthy growth of farm products. In compounding these chemicals, it is possible to limit the effect thereof so as to be fatal to only one particular family of plants but is difficult to limit the fatal effect to any one particular specie within a family. Corn is a member of the grass family and therefore is affected by solutions designed to kill grass. Recently, however, a chemical solution has been developed which, though fatal to grass and weeds, will not affect corn plants even if it is sprayed on the stalks provided it is not sprayed directly on the leaves of the plant. Therefore, a great need has arisen for a device which will effectively raise the lower leaves of a corn plant and allow the chemical to be sprayed around the stalk to kill the grasses adjacent thereto. Further, this device must not bruise the stalk of the plant, which would thereby allow the spray solution to penetrate the stalk itself and thus prove fatal to the plant.

In accordance with this need, I have developed a leaf lifting and weed spraying device designed to effectively lift the lower leaves of a plant such as corn, allowing chemicals to be sprayed thereunder.

It is an object of my invention to provide a leaf lifting device having a universal mounting to facilitate attachment to any of several implements usually present on any farm and with sufficient adjustment means incorporated therein to allow the chemical to be sprayed adjacent the base of a corn stalk.

It is a specific object of my invention to provide a pair of cooperating flexible leaf lifting members to efficiently lift the leaves on the lowermost portion of a corn stalk as it is being propelled along a row of corn and maintain the leaves in the elevated position until the chemical solution has been sprayed thereunder.

It is a further specific object of my invention to provide a leaf-lifting device operating along a row of corn to elevate the lower leaves of the individual plants and sufficiently flexible so as to spread apart and allow the stalk to pass therebetween without bruising the stalk.

It is a further specific object to arrange a nozzle member in close relation to the leaf lifting members of my device so as to direct a spray beneath the leaves being lifted.

These and other objects and advantages of my invention will more fully appear from the following description made in connection with the accompanying drawing drawings, wherein like reference characters refer to the same or similar parts throughout the several views, and in which:

FIG. 1 is a plan view of my invention as mounted on a cultivator being pulled by a tractor;

FIG. 2 is a rear elevation taken substantially along the line 2—2 of FIG. 4;

FIG. 5 is an elevation of a modified form of my invention; and

FIG. 6 is a plan view of my invention taken substantially along line 6—6 of FIG. 5.

Figures 3, 4:
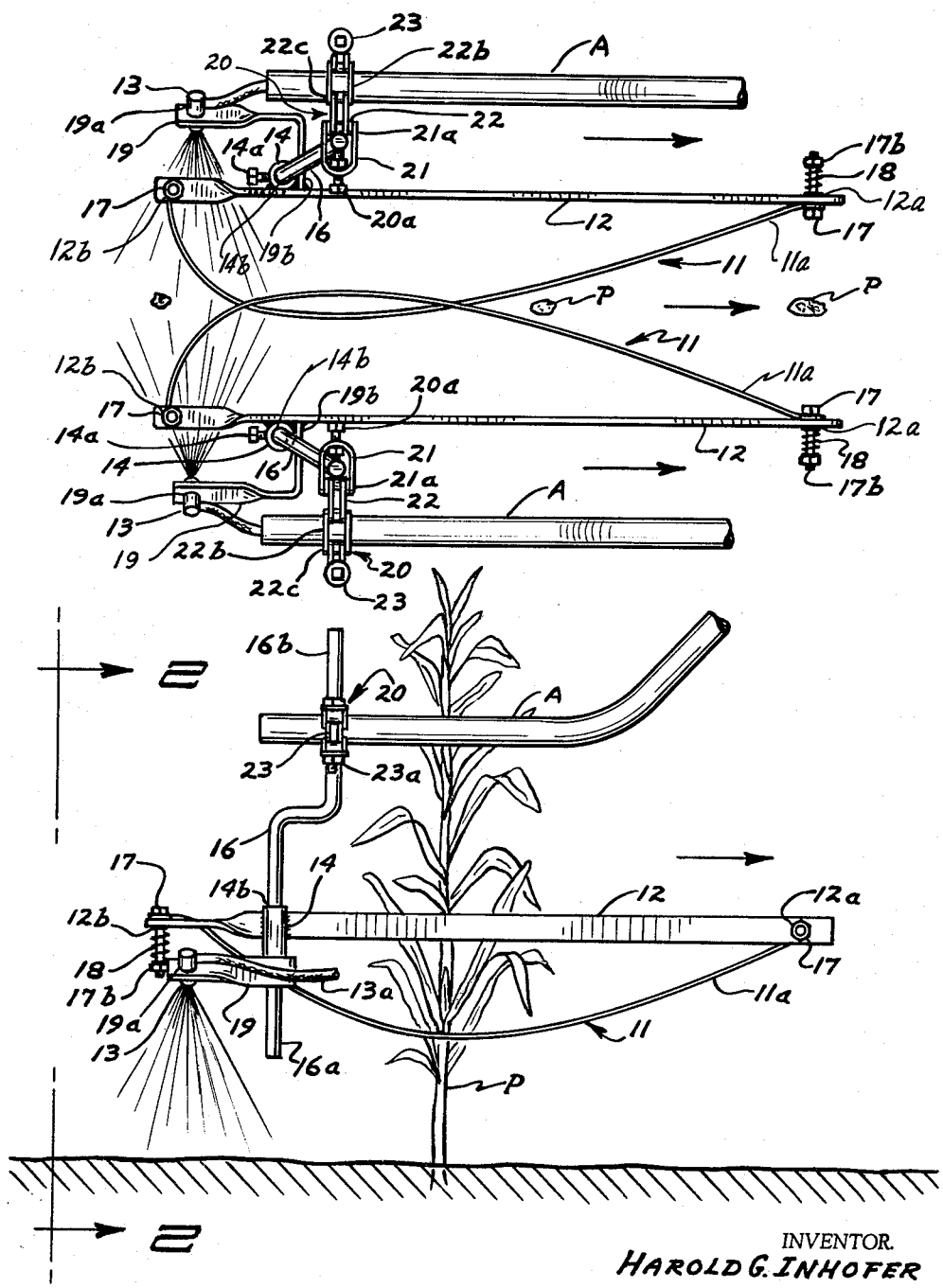
FIG. 3 is a plan view of my leaf lifting and spraying device.
FIG. 4 is a side elevation of my invention.

In my invention of a leaf lifting device, I provide a right-hand and a left-hand member and arrange them accordingly on the respective sides of a row of corn plants F. Any available farm implement such as the cultivator C, pulled by the tractor T, shown in FIG. 1, may be used as the support member and for simplicity of description I show a pair of support bars A moving in the direction of the arrows in FIGS. 3 and 4. Generally, I provide a flexible leaf-lifting member 11 arranged to effect a compound curve to pick up and elevate the lower leaves and flexibly attached to a generally horizontally disposed rigid bar member 12. A spray nozzle 13 is arranged to underlie the lifting member 11 at a point where the compound curve raises the leaves a maximum distance from the ground, and is directed to spray downward and inwardly toward the plant P. An adjustable support member includes an elongated bell crank 16 slidably attached to said bar member 12 as by the sleeve member 14 and set screw 14a and a universal attachment member 20 securely mounted on a farm implement A.

More specifically, the leaf lifter 11 may be made from a flexible resilient member such as wire and formed into an arcuate section of a circle and having its endmost portions rolled into small circular portions such that a bolt 17 may pass therethrough. In the form shown, the compound curve of the leaf lifting wire 11 is effected by providing a 90° axial bend in the support bar 12 as to position the attaching holes at the front 12a and rear 12b in planes which are disposed at 90°. The forward opening 12a is disposed in a vertical plane and the rear opening 12b is a horizontal plane. By offsetting the holes in this manner, the leading edge 11a of the lifting wire 11 will pick up the lower leaves on a corn stalk and raise them along the shape of the curve as the machine is pulled forward. The compound curve further enables the stalk itself to force the flexible wire member 11 downward and outward upon contact therewith so as not to injure the outer surface of the stalk. Sufficient flexiblility is afforded to the leaf lifter 11 by forming the attaching holes 12a and 12b substantially larger than the attaching bolt member 17 and further interposing a spring means 18 between the bar member 12 and the nut 17b provided on the end of the bolt. The spring means 18 absorbs a portion of the force exerted upon the leaf lifter 11 and therefore a portion of the stress that would ordinarily be absorbed by the leaf lifter 11, affording longer life and usefulness to the same.

The spray nozzle 13 is arranged to pass through an opening 19a in a nozzle support bar 19 which, in the form shown, has one end 19b attached to the rigid support member 12 and extends therefrom to position the nozzle 13 in close spaced relation to the rear attachment hole 12b. Said nozzle support bar 19 is further arranged so as to direct the spray from the nozzle 13 downward and inward therefrom toward the base of the stalk. By placing the nozzle in this position, the sprayed solution is maintained at an elevation below the raised leaves and therefore no chemical is sprayed on the leaves themselves. The spray supply line 13a is connected to said nozzle 13 and extends therefrom to any suitable pump S or pressure source. The spray system and nozzle may be any suitable commercial product, and therefore no further explanation is deemed necessary.

A tubular sleeve member 14 is securely attached at any point along the rigid support bar 12 as by welding and is further arranged such that the opening 14*b* therethrough is in a vertical position. Adjustment means such as the set screw 14*a* are provided on the sleeve 14. A bell crank 16 of substantial length and throw has one end 16*a* thereof passing through the sleeve opening 14*b* such that the sleeve 14 is adjustable therealong. Universal attachment bracket 20 comprising a U-shaped member 21 having its arms 21*a* securely fastened to a chain link 22 is arranged on the other end 16*b* of said crank with an adjusting means such as a screw 20*a* passing through said U-shaped portion for adjustment therealong. The mounting 20 further includes a plurality of chain links 22*b* pivotally fastened to one another as by the pins 22*c*. A clamping member such as the bolt 23 is provided to pass through any two of said links to clamp said attachment around any support member such as the bar A shown in FIG. 2. This universal attachment member is designed to be used on any shape support member, and as best shown in FIG. 2 will conform to the general shape of the support member and allow rigid attachment thereto.

In operation of my leaf lifting device, a pair of right and left-hand leaf lifting elements is arranged on any suitable farm implement or similar support to be propelled through a field of corn. The universal attachment bracket is tightly secured to the support members as by tightening the nut 23*a* on the bolt 23 passing through two selected links of the bracket. Vertical height for the spray device may be adjusted by sliding the bell crank 16 through either the U-shaped member 21 or the sleeve member 14 and tightening the appropriate set screws thereon. Horizontal displacement of my device is attained by rotating the bell crank 16 either clockwise or counter-clockwise so as to place the leaf lifting wire members 11 in overlapping fashion, as best shown in FIG. 3. The configuration of the two lifting elements 11 is such that they diverge gradually toward the forward ends thereof and the stalks pass into this rearwardly converging opening to engage the elements at the lowest points of their compound curve. The elements then rise progressively to the rear mounting portions of the bars 12 and the engaged leaves will be elevated thereby until they are released by the sharply divergent rear bends in the wires, as best shown in FIG. 3. By overlapping the wire members 11, I have found that my device not only elevates leaves extending angularly to the row of corn but further picks up the majority of leaves that may lie in line with the corn stalks. Suitable liquid connections are made to the spray lines 13*a* and nozzle 13 and my device is propelled along the corn row as by the tractor T to efficiently spray the same.

In a modified form of my invention as shown in FIGS. 5 and 6, I provide a simplified mounting that will maintain the leaf lifting elements 11 and the spray nozzles 13 in constant relation to the ground. In describing this modified form it will be understood that the leaf lifter and spray device generally designated K is substantially the same as that described in my preferred form. In this form a substantially long mounting bar M is carried by a tractor T and is removably attached thereto by a support frame N. A carrier shoe 30 is rotatably mounted on the mounting bar M by a loop member 30*a* on one end thereof and has a ground contact portion 30*b* intermediate the ends which, when in operation, maintains contact with the ground. A leaf lifter support portion 30*c* extends generally upward from the ground contact portion 30*b* and in the form shown is receivable within the tubular sleeve member 14 of the leaf lifter device K which is adjustable therealong. A pair of collar members 31*a*–31*b* is provided on the mounting bar M to lie on either side of one of said carrier shoes 30 and is provided with a set screw 32 to prevent longitudinal movement therealong. The collar members 31*a*–31*b* are, of course, placed apart so as to allow the carrier shoe 30 to rotate therebetween about the bar M.

In operation of my modified form the mounting bar M is secured to the tractor T through the frame N. A pair of carrier shoes is arranged along said bar at proper spaced intervals such that when the leaf lifting devices K are placed thereon the leaf lifting elements 11 will overlap as shown in FIG. 6. Collar members 31*a*—31*b* are tightened onto the bar M on either side of the carrier shoes 30 in proper relation to said shoe 30 for free rotation thereof. A pair of leaf lifting and spray devices K are then placed on the support portion 30*c* and arranged at the proper level above the ground contact portion 30*b* and the set screw 14*a* is tightened thereon. Connections are made between the spray nozzles 13 and pumping means on the tractor T through the conduits 13*a*. Upon movement of the tractor T the carrier shoe 30 will oscillate about the mounting bar M maintaining the ground contact portion 30*b* in constant contact therewith. This rotation of course will maintain the leaf lifting and spray device K in constant relation to the ground it is being carried over thus allowing the leaf lifting elements to lift the leaves of the plants and the spray nozzle to spray thereunder as described in my preferred form.

It may be seen that I have provided a simple and unique leaf lifting device that will efficiently lift the leaves on a row of corn or any other plant that has leaves or branches growing at a lower level, thereby allowing chemical to be sprayed at the base of the plant without saturating these lower leaves.

It will, of course, be understood that various changes may be made in the form, details, arrangement and proportion of parts without departing from the scope of my invention, which generally stated consists in the subject matter set forth in the appended claims.

I claim:

1. Weed spraying apparatus comprising supporting means adapted to be mounted on a transportable vehicle, a pair of spray nozzles horizontally spaced in a direction transverse to the direction of travel of such vehicle and being disposed to direct the liquid spray discharged therefrom onto only the lowermost portion of the crop plant stems and the ground surrounding said stem, a pair of opposed leaf-lifting elements mounted on said supporting means in preceeding relation to said spray nozzles and being resilient to permit engagement with the leaves and stem of the individual plants without damaging the same, the initial plant engaging portions thereof being disposed below the portions therebehind so that leaves engaged thereby will be elevated out of the path of the spray pattern produced by said spray nozzles to prevent contact between the leaves and the spray liquid.

2. The structure set forth in claim 1, and a generally horizontally disposed mounting bar for each of said leaf lifting elements.

3. The structure set forth in claim 2 and anchoring elements loosely received in the end portions of said mounting bars to respectively attach said leaf lifting elements to said mounting bars while permitting said ends to move in accordance with the orientation of the intermediate portions of said elements.

4. The structure set forth in claim 3, and a generally vertical mounting means interposed between and attached to each of said horizontal mounting bars and said supporting means, said mounting means being adjustable as to vary the distance between said bars and vehicle.

5. The structure set forth in claim 4, and said mounting means being adjustable in a horizontal direction to vary the distance between said leaf lifting elements.

6. The structure set forth in claim 2 and mounting means interposed between and attached to each of said horizontal mounting bars and said supporting means, said mounting means adapted to oscillate about said supporting means, a portion of said mounting means intermediate said horizontal mounting bar and said support means in contact with the ground to maintain said horizontal mounting bar in constant relationship to the ground.

References Cited in the file of this patent

UNITED STATES PATENTS

| | | |
|---|---|---|
| 1,656,171 | Cox | Jan. 17, 1928 |
| 1,733,883 | Jaecks | Oct. 29, 1929 |
| 2,301,213 | Kang | Nov. 10, 1942 |
| 2,531,741 | Peck | Nov. 28, 1950 |
| 2,580,145 | White | Dec. 25, 1951 |

FOREIGN PATENTS

| | | |
|---|---|---|
| 694,142 | France | Sept. 9, 1930 |